Sept. 29, 1959   J. M. ZEIGLER   2,906,376
NON-SKID BRAKING SYSTEM USING PRE-SET PULSING ACTION
Filed March 6, 1957
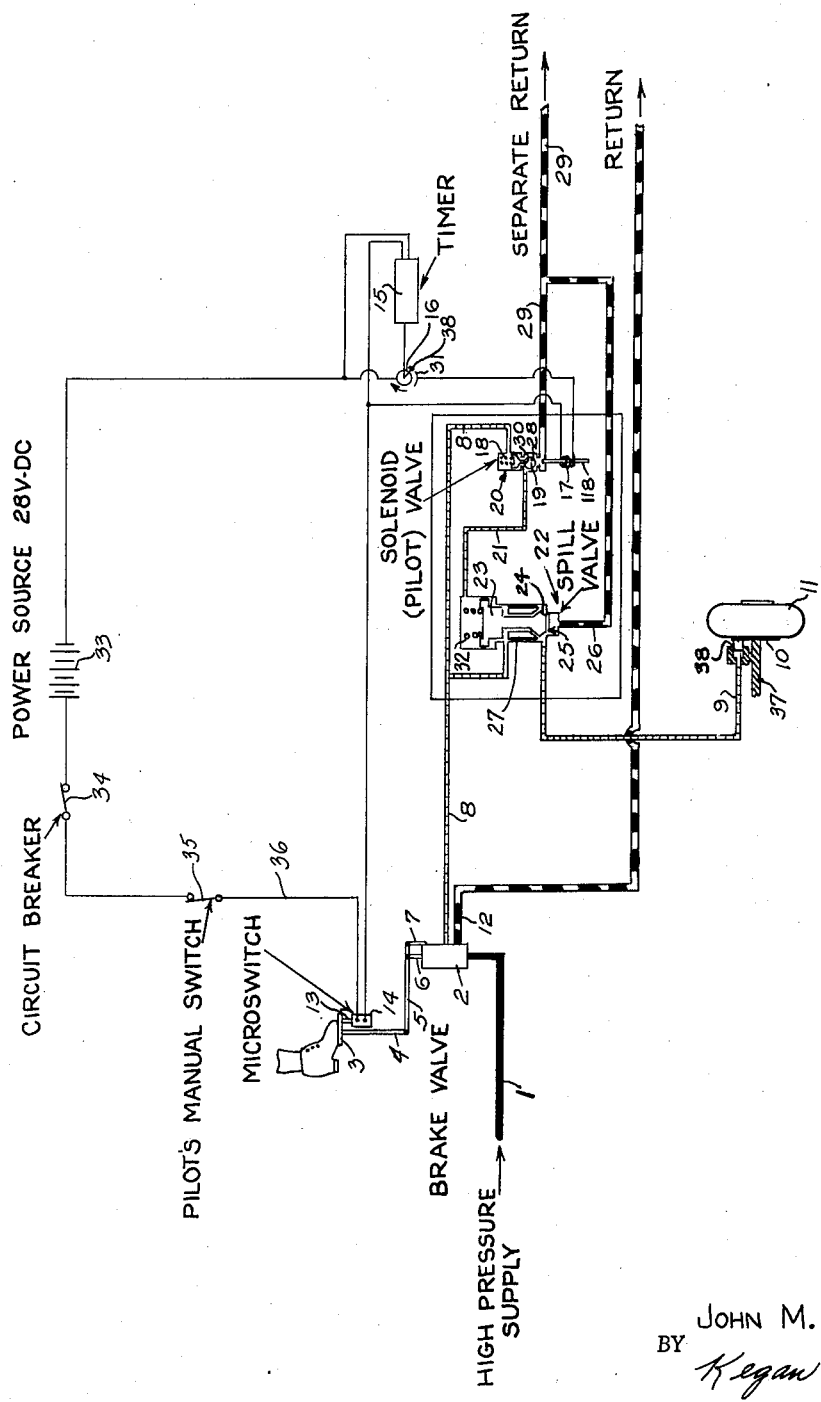
INVENTOR.
JOHN M. ZEIGLER
BY Kegan and Kegan
Att'ys.

United States Patent Office 2,906,376
Patented Sept. 29, 1959

1

2,906,376

NON-SKID BRAKING SYSTEM USING PRE-SET PULSING ACTION

John M. Zeigler, Hamilton, Ohio, assignor, by mesne assignments, to Divco-Wayne Corporation, a corporation of Michigan Application March 6, 1957, Serial No. 644,399

3 Claims. (Cl. 188—85)

This invention relates to braking devices and methods for rapidly stopping a moving vehicle, such as landing aircraft, automobiles, locomotives and railroad trains, and in general any vehicle having wheels and a braking system which operates through said wheels, and the like.

The gist of the present invention resides in the concept of intermittently and rapidly applying and relieving the braking force, so as to interrupt and reinstate the decelerating action more rapidly and certainly than can be done with a manually operated brake or the like subject to the limitations of human reaction time. In my invention, the braking cycle is repeated from once every second to a hundred times every second, or even more.

Hitherto it has been generally believed that in order to avoid skidding and the consequent loss of braking action, it was necessary to supply aircraft landing brake systems and the like with some type of deceleration sensing apparatus which would modulate the braking force whenever the deceleration rate became so great as to indicate that a skid was impending. Such sensing devices would then automatically control the braking system. Obviously, the sensing system is subject to the disadvantages of any control system; and its elimination would be highly desirable.

Pumping the brake pedal of an automobile or like vehicle has long been recommended to prevent skidding. This maneuver is limited, however, by the reaction time of the operator, and by his psychological response under panic conditions, so that in practice it cannot be relied upon when needed most. Furthermore, no manually operated system can be worked with the rapidity necessary to prevent a landing aircraft from skidding, since the braking pressure should be modulated in the vicinity of 5 to 10 times a second. The optimum rate of modulation or interruption of braking action, of course, varies with the device. For example, in vehicles and under circumstances where the time and distance involved in stopping is not particularly critical, the rate of modulation of the braking force can be quite slow, so that each cycle may even be several minutes long. On the other hand, when it is essential to stop a vehicle high momentum in minimum space, the braking cycle should be of the order of fractions of a second, sometimes as short as 0.01 second, or even less.

Accordingly, it is a principal object of the present invention to provide improved systems for stopping wheeled vehicles with maximum efficacy in minimum space, while minimizing or completely eliminating any risk of skidding.

A related important object is to provide systems whereby the braking force is modulated automatically in cycles of relatively brief duration, and without reliance upon human judgment or upon special sensing devices.

Other objects and advantages of the invention will become apparent as this specification proceeds, and are inherent in the construction shown schematically in the drawing.

2

The basic underlying concept of the present invention can be applied to virtually any type of braking system. Nevertheless, for convenience and clarity in exposition, the invention is herein described with reference to a particular embodiment thereof shown in the attached drawing, which is a schematic representation of one exemplary embodiment of the concepts of the instant invention applied to a hydraulic braking system for aircraft landing wheels.

The present invention provides any conventional braking system, such as that exemplified in the drawing annexed hereto, with a control system which automatically and rapidly engages and disengages the brake, or cyclically varies the braking pressure without necessarily completely interrupting the braking action. Preferably the friction on the brake must be reduced in each cycle to a level less than the friction of the associated wheel against the surface on which it runs, in order to prevent skidding. In each automatic cycle the braking force is varied from that applied through manual operation of the brake pedal, which need not necessarily be the maximum which the system is capable of, to a value less than the friction between the wheel and its contact surface. No skidding will occur as long as the friction between the wheel and its contact surface is greater than the friction between the engaged frictional elements of the brake.

The annexed drawing shows a somewhat conventional braking system modified to introduce the automatic pulsating braking modulation which is the gist of the present invention. The conventional portion of the braking system shown includes a high pressure hydraulic supply line 1 which supplies pressure to a brake control valve 2 which is operated by a foot pedal 3, through conventional linkage 4, 5, 6 and 7. Depressing brake pedal 3 opens brake control valve 2, thereby supplying pressure to the hydraulic fluid brake line 8.

Conventionally, said pressure would be transmitted to the brake supply portion 9 of the line, and would actuate the braking device 38, associated with the brake disc 10 fixed to wheel 11, which has a supporting structure 37. When the foot pedal 3 would be released, enough of the hydraulic fluid would bleed back through line 9, brake valve 2 and return line 12 to relieve the pressure on the braking system, and the wheel would again be able to rotate free of the frictional deceleration due to the braking system.

My invention may be incorporated in the aforesaid conventional hydraulic brake system by positioning the actuating lever 13 of a micro-switch 14 so that depressing pedal 3 closes micro-switch 14, thereby starting timer 15, which controls the motor-driven rotating switch 16. Said switch continues to rotate as long as brake pedal 3 is depressed. When switch 16 breaks the electrical circuit to solenoid coil 17, the bias spring 18 depresses the ball valve 19 of the solenoid-actuated pilot valve assembly 20. This completes the hydraulic circuit in the brake line 8, permitting the hydraulic fluid therein to pass through the pilot valve 20 into the connection 21 and thence into the main valve or spill valve 22, where the applied hydraulic pressure opens valve 22 by depressing valve piston or main-valve actuator 23. This causes the valve stem 24 to seat against its associated valve seat 25, thereby closing off the separate hydraulic return 26 from the spill valve 22. The same action of the valve piston 23 opens chamber 27 to the brake supply line 8 and the segment 9 thereof which communicates with the brake assembly 38. This simultaneous or sequential closing of the return line 26 and opening of the pressure supply line 9 causes the hydraulic fluid to press the braking element 38 against its associated spinning brake surface 10 on the wheel, thereby braking wheel 11.

As the rotating arm 38 of the rotary switch 16 continues in its cycle, it contacts sector 31 and completes the electric circuit to solenoid 17, thereby forcing solenoid core 118 upward to unseat ball valve 19 from its lower valve seat 28, and thus bleeding off the pressure in the spill valve actuating pressure line 21, by spill of hydraulic fluid through the open valve region 28 into the separate return line 29. Simultaneously, the action of solenoid 17 seats ball valve 19 against its upper valve seat 30, thereby interrupting the hydraulic circuit from the high pressure supply line 8 to the actuating line 21. This permits spill valve 22 simultaneously to close the connection between supply line 8 and feed line 9, and to open the connection between said feed line 9 and the return line 26, thereby disengaging the brake.

As the rotating arm 38 continues in its cycle, the current to the solenoid 17 is again interrupted, and the original state re-established. The ratio of the time interval of the closed electric circuit to the open circuit is determined by the angular extent of the segmental contact 31. Ordinarily the braking action will be interrupted for about one-half of each braking cycle. The ratio of open circuit time to closed circuit time may readily be varied, and will be varied from installation to installation in accordance with the requirement of each installation. The frequency of the braking pulse cycle is determined in advance and set so that the wheels are released before any skidding can begin.

When the pressure in connection 21 is relieved through return line 29, the pressure in the supply line 8 is sufficient to close the spill valve 22 against the resistance of its spring 32.

The electrical circuit is, of course, provided with a power source 33 and conventional circuit breaker 34. It may also be provided with a manual switch 35. When this switch is opened, the electrical circuit 36 is interrupted, thereby converting the system to a conventional prior art braking system. Thus the pilot may brake a parked plane by locking wheel 11.

In my invention, a separate hydraulic fluid return line 29 is usually provided because the main return line 12 often has such a pressure in it, due to the operation of other devices on the vehicle, as to block immediate discharge of hydraulic fluid when the valves 20 and 22 are operated.

While the invention has been described above as applied in a particular way to one conventional form of braking system, it is obvious that virtually any braking system, whether hydraulic, pneumatic, electrical or mechanical, can be provided with any of the forms of my improved brake pressure fluctuating, modulating or interrupting mechanism, whether hydraulic, pneumatic, electrical or mechanical. In general these forms of modulating brake action may be used in any permutation to control the pattern of braking, regardless of the braking technique to which my invention is to be applied.

The frequency of fluctuation of the braking force should not be the same as the natural resonance frequency of the vehicle. It should also be different from the resonance frequency of the member which supports the braked wheel. In addition, said frequency should be one which insures that the wheel will reaccelerate during the unbraked portion of the cycle, since it is essential that the wheel keep turning to prevent skidding and the concomitant excessive wear upon the surface of the wheel in contact with the ground.

From the foregoing specifications, it is apparent that my system makes unnecessary any deceleration sensing device, and thereby eliminates the problems of maintenance, adjustment and repair inevitably connected therewith. It does not rely at all upon the human factor to prevent skidding; and therefore operates with equal efficiency under panic conditions and under normal operating conditions.

Thus it will be seen that my concept of automatically and rapidly cyclically relieving the braking force for short intervals of time provides a novel and more effective solution to skidding problems, and achieves more positive and effective braking than has hitherto been known.

While the foregoing description is specific and explicit in some portions, for convenience of exposition, it is to be understood that I limit the scope of my invention only as defined in the appended claims.

I claim:

1. A pre-set non-skid system for applying braking and non-braking action alternately to the brake of a wheel of a vehicle, comprising at least one source of power comprising a source of fluid-pressure power, a fluid-pressure-controlled brake operator, a main valve, means including the main valve for operatively connecting the said brake operator to said source of fluid pressure power, the main valve having a braking position in which it supplies the said brake operator from the connected source of power and having a release position in which it excludes said source of power from said brake operator, a pressure responsive main-valve actuator means operatively connected to the main valve and controllable to move the main valve between its said positions, a pilot valve, means including the pilot valve for operatively connecting said source of fluid-pressure power to the main-valve actuator, the pilot valve having fluid flow positions corresponding respectively to the said positions of the main valve, a pilot-valve actuator and means for operating it at the will of the operator of the vehicle to move the pilot valve between its said positions at a predetermined frequency and with a predetermined ratio of dwell in such positions, the main valve being thereby moved between its said positions at the same predetermined frequency and at a corresponding ratio of dwell to thereby correspondingly apply and release the said brake.

2. A system according to claim 1, which further includes a brake valve controlled by the operator of the vehicle along with the said means for intermittently controlling the said pilot valve, the said brake valve being interposed between the said main valve and the said source of fluid-pressure power.

3. A system according to claim 1, in which the said pilot-valve actuator is controllable from a said source of power, and wherein the said means for operating it includes a pulser operatively interposed between the pilot-valve actuator and the last said source of power.

References Cited in the file of this patent

UNITED STATES PATENTS

| | | |
|---|---|---|
| 2,069,578 | Eaton | Feb. 2, 1937 |
| 2,747,697 | Banker | May 29, 1956 |
| 2,753,017 | Curl et al. | July 3, 1956 |
| 2,799,462 | Steigerwald | July 16, 1957 |
| 2,800,370 | Whitney | July 23, 1957 |
| 2,807,141 | Stroder | Sept. 24, 1957 |
| 2,812,983 | Bush | Nov. 12, 1957 |
| 2,826,278 | Highley | Mar. 11, 1958 |

FOREIGN PATENTS

| | | |
|---|---|---|
| 50,803 | France | Apr. 18, 1941 |
| 493,697 | Great Britain | Oct. 10, 1938 |
| 696,470 | Great Britain | Sept. 2, 1953 |
| 735,814 | Great Britain | Aug. 31, 1955 |

OTHER REFERENCES

Publication: Aero Digest, vol. 2, issue 2, pages 36, 38, 42. Published August 1951.

UNITED STATES PATENT OFFICE
CERTIFICATION OF CORRECTION

Patent No. 2,906,376                            September 29, 1959

John M. Zeigler

It is hereby certified that error appears in the above numbered patent requiring correction and that the said Letters Patent should read as corrected below.

Column 1, line 56, after "vehicle" insert -- having --.

Signed and sealed this 9th day of May 1961.

(SEAL)
Attest:

ERNEST W. SWIDER
Attesting Officer

DAVID L. LADD
                                               Commissioner of Patents